United States Patent [19]
Cahill, III

[11] Patent Number: 5,986,697
[45] Date of Patent: Nov. 16, 1999

[54] METHOD AND APPARATUS FOR RASTER CALIBRATION

[75] Inventor: Benjamin M. Cahill, III, Ringoes, N.J.

[73] Assignee: Intel Corporation, Santa Clara, Calif.

[21] Appl. No.: 08/833,662

[22] Filed: Apr. 7, 1997

Related U.S. Application Data

[63] Continuation of application No. 08/367,957, Jan. 3, 1995, Pat. No. 5,668,594.

[51] Int. Cl.⁶ .................................................. H04N 17/00
[52] U.S. Cl. .......................... 348/194; 348/510; 395/553; 395/556
[58] Field of Search ..................................... 348/194, 536, 348/510; 345/112, 132, 213, 302, 502, 526; 395/553, 556, 555, 554, 558, 559; 310/2, 20, 18, 25

[56] References Cited

U.S. PATENT DOCUMENTS

| | | | |
|---|---|---|---|
| 4,498,098 | 2/1985 | Stell | 348/510 |
| 4,554,582 | 11/1985 | Wine | 348/510 |
| 4,580,165 | 4/1986 | Patton et al. | 348/510 |
| 4,631,588 | 12/1986 | Barnes et al. | 348/510 |
| 4,670,785 | 6/1987 | Medin | 348/510 |
| 5,586,309 | 12/1996 | Lin | 395/556 |
| 5,615,376 | 3/1997 | Ranganathan | 395/750 |
| 5,696,950 | 12/1997 | Ichinose et al. | 395/556 |

*Primary Examiner*—Victor R. Kostak
*Attorney, Agent, or Firm*—Blakely, Sokoloff, Taylor & Zafman

[57] ABSTRACT

A method and apparatus for raster calibration is described. Calibration circuitry operates in the context of a local video subsystem which receives at least one sync signal from a remote video (typically graphics) subsystem. The calibration circuitry calibrates a local raster of the local video subsystem to a remote raster of the remote video subsystem. The calibration circuitry includes measurement circuitry for measuring a first duration of a first phase of the sync signal, and for measuring a second duration of a second phase of the sync signal. Processing logic compares the first and second durations and determines that the phase having the shorter duration is an active phase, the active phase corresponding to the polarity of the sync signal. The processing logic also adds the first and second durations to provide an estimate of the scan line period of the remote raster. The calibration circuitry generates an estimate of the remote raster clock frequency by initializing a local raster clock (preferably a PLL) with an initial clock value, and phase locking the local raster dock to the sync signal to thereby generate an estimate of the remote raster clock signal. The initial clock value is set in a variety of ways. The calibration circuitry also confirms the frequency of the estimated remote raster clock signal by comparing a measured size of a graphics object generated by the remote video subsystem with a known size of the object. Further, the calibration circuitry aligns the local and remote rasters.

7 Claims, 10 Drawing Sheets

METHOD AND APPARATUS FOR RASTER CALIBRATION

This is a continuation of application application Ser. No. 08/367,957, filed Jan. 3, 1995 U.S. Pat. No. 5,668,594.

BACKGROUND OF THE INVENTION

1. Field of the Invention

The present invention relates to the field of computer video systems, and more particularly to calibrating a local raster to an external remote raster.

2. Description of the Related Art

Modern data processing systems generally provide visual output by way of such output devices as cathode ray tubes or liquid crystal displays. The performance of such systems can be enhanced when the visual display receives information from more than one source, and overlays the information received from a first source with the information received from a second source. For example, a first video subsystem may provide background graphics, such as windows, on a rasterized computer display. A separate video subsystem, typically residing on a video card, may provide video information, such as a photographic image, which overlays the inside of the window to serve as the contents of the window.

When operating in native mode, most conventional video subsystems generate static images, such as document text. Recent technological advancements have made possible video cards for generating motion video for applications such as video conferencing. It is desirable to provide the capability to install such an advanced video card in a host computer system that employs a preexisting video (typically graphics) subsystem. However, to achieve compatibility between the new video subsystem and the preexisting graphics subsystem, a number of the motion video subsystem raster parameters must be calibrated to the graphics raster so that video images produced by the video card are aligned and synchronized with graphics generated by the graphics subsystem. Conventional systems require the user to visually align a test pattern generated by the local video subsystem with a test pattern generated by the remote graphics subsystem. It is desired to find a less cumbersome means for calibrating the local raster to the remote raster.

BRIEF DESCRIPTION OF THE DRAWINGS

The objects, features and advantages of the present invention will be apparent to one skilled in the art in light of the following detailed description in which.

SUMMARY OF THE INVENTION

The present invention provides a method and apparatus for raster calibration. Calibration circuitry of the present invention operates in the context: of a local video subsystem which receives at least one sync signal from a remote video (typically graphics) subsystem. The calibration circuitry calibrates a local raster of the local video subsystem to a remote raster of the remote video subsystem. The calibration circuitry includes measurement circuitry for measuring the duration of a first phase of the sync signal (the first duration), and for measuring the duration of a second phase of the sync signal (the second duration). Processing logic compares the first and second durations and determines that the phase having the shorter duration is an active phase, the active phase corresponding to the polarity of the sync signal. The processing logic also adds the first and second durations to provide an estimate of the scan line period of the remote raster.

The calibration circuitry generates an estimate of the remote raster clock frequency by initializing a local raster clock (preferably a phase locked loop) with an initial clock value, and phase locking the local raster clock to the sync signal to thereby generate an estimate of the remote raster dock signal. Using one approach, the initial clock value may be set to the estimated scan line period. Alternatively, the processing logic may initialize the local raster clock to the visible display line resolution of the remote raster scaled by a predetermined scaling factor. In yet another approach, mapping circuitry may be used to map the visible display line resolution to a total display line resolution, to which the local raster clock is initialized by the processing logic. As a further refinement, the mapping circuitry may map the visible display line resolution to the total display line resolution that most closely approximates the estimated scan line period. The processing logic then initializes the local raster clock to that total display line resolution. In all cases, the total display line resolution represents the total number of visible and invisible pixels in a scan line.

To confirm the estimated remote raster clock frequency, the remote video subsystem generates a graphics object having a predetermined size $\Delta W_{graphics}$. The measurement circuitry calculates a measured size $\Delta W_{measured}$ of the graphics object under control of the estimated remote raster clock signal. The calibration circuitry scales the estimated remote raster clock frequency by $\Delta W_{graphics}/\Delta W_{measured}$.

To align the local and remote rasters, the remote video subsystem generates a graphics object under processor control. The processor specifies a specified leading edge position of the graphics object in terms of visible pixels referenced to a leading edge of a visible raster interval. The measuring circuitry measures the position of a leading edge of the graphics object with reference to a leading edge of the sync signal to thereby provide a measured leading edge position. The calibration circuitry subtracts the specified graphics object leading edge position from the measured leading edge position to generate an offset. The offset is refined by subtracting a video delay to generate an adjusted offset. The video delay represents a delay in the local video subsystem between a video input of the local video subsystem and a display monitor. The video input is used to receive a video signal from the remote video subsystem. The calibration circuitry adds the adjusted offset to a visible pixel coordinate specified by the processor to thereby generate a pixel coordinate referenced to a leading edge of the sync signal.

DETAILED DESCRIPTION OF THE INVENTION

The present invention provides a method and apparatus for raster calibration. For purposes of explanation, specific details are set forth to provide a thorough understanding of the present invention. However, it will be understood by one skilled in the art, from reading this disclosure, that the invention may be practiced without these details. Moreover, well-known elements, devices, process steps and the like are not set forth in order to avoid obscuring the invention.

Figure 1:
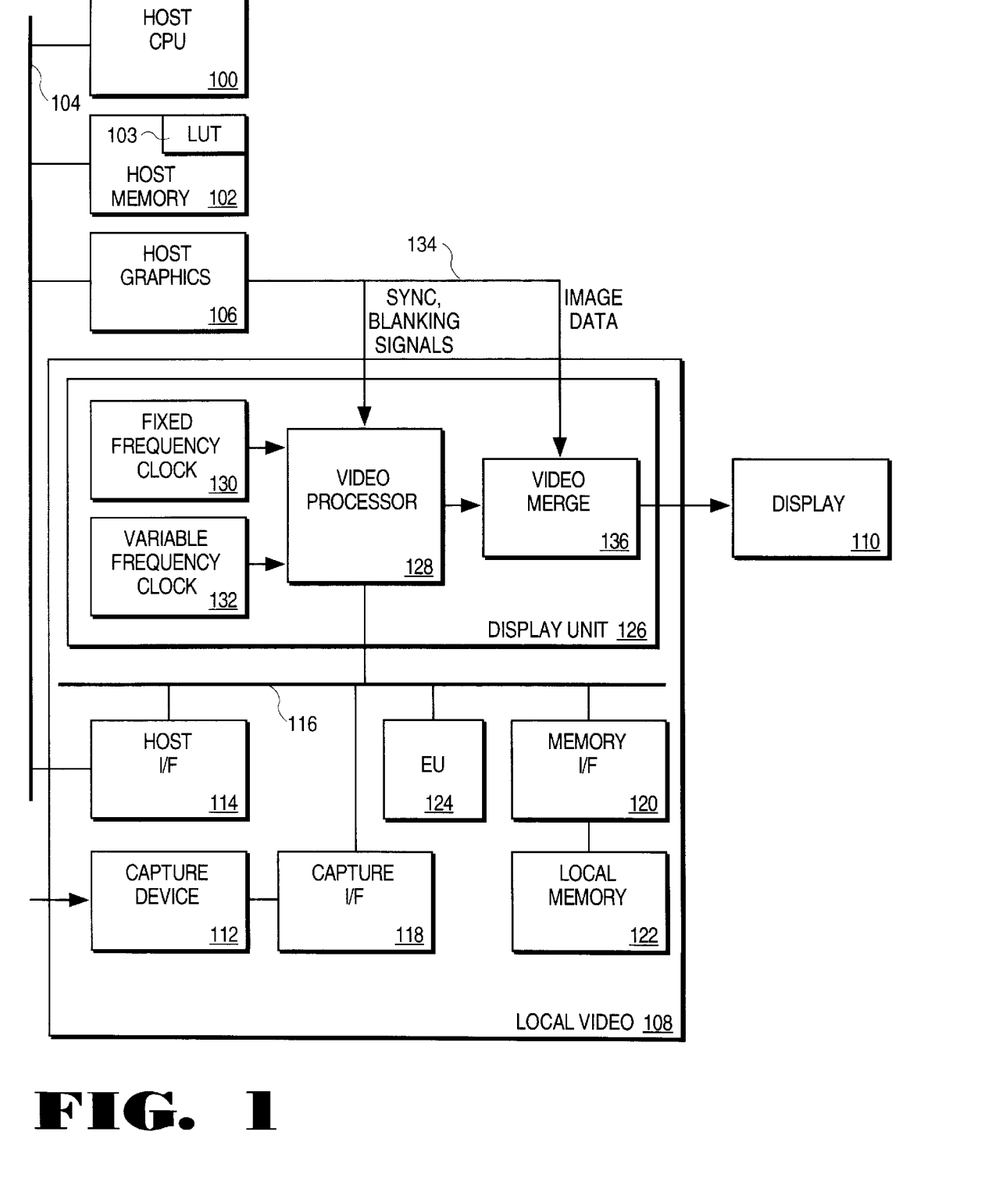
FIG. 1 illustrates a computer system incorporating the video subsystem of the present invention.

FIG. 1 illustrates a computer system incorporating the video subsystem of the present invention. The computer system includes a host CPU 100 coupled to a host memory device 102 through a host system bus 104. A remote graphics subsystem 106, such as a VGA device, feeds graphics information to a local video subsystem 108 of the present invention. The graphics output would normally be provided directly to a display monitor in the absence of the video subsystem 108. The local video subsystem 108, in turn, provides display data and control signals to a display monitor 110. The local video subsystem 108 also receives captured video signals through a capture device 112. A typical input to the capture device is a video camera output signal, for example. The video subsystem 108 preferably resides on one video card. Those skilled in the art will understand that either subsystem 106 or 108 or both may act as a video and/or a graphics source. The description herein of subsystem 106 as a graphics subsystem and of subsystem 108 as a video subsystem is a matter of convenience used to illustrate a typical configuration.

The local video subsystem 108 includes a host interface 114 for interfacing units of the local video subsystem 108 to the host system bus 104. The host interface 114 is coupled to a local video bus 116. A capture interface unit 118 interfaces the local video bus 116 to the capture device 112. A video memory interface unit 120 interfaces the local video bus 116 to a local video memory 122, which is used to store bit maps of the video image. A video execution unit (EU) 124 is also coupled to the local video bus 116. The EU 124 performs such functions as compression and decompression of images.

A display unit 126, coupled to the local video bus 116, includes a video display processor 128, which receives a clock signal from a fixed frequency clock 130, and another dock signal from a variable frequency dock 132. Over a cable or other connector 134, the local video subsystem 108 receives control and data signals from the remote graphics subsystem 106. The video display processor 128 preferably receives horizontal and vertical sync signals and blanking signals over the cable 134. A video merge device 136 receives video information from the video processor 128 and graphics information from the graphics subsystem 106. The video and graphics information may, for example, be in RGB or YUV form. The video merge device 136 overlays the video and graphics images, and provides the composite image to the display monitor 110. The display monitor 110 includes a digital-to-analog converter (DAC) (not shown) for converting the composite digital image from the video merge device 136 to an analog image for display. The display monitor 110, the capture device 112, the local memory 122, the video merge device 136 and the two clocks 130 and 132 may reside outside of a video chip on which the other units of the video subsystem 108 are integrated. Those skilled in the art will recognize that other configurations are possible.

Figure 2:
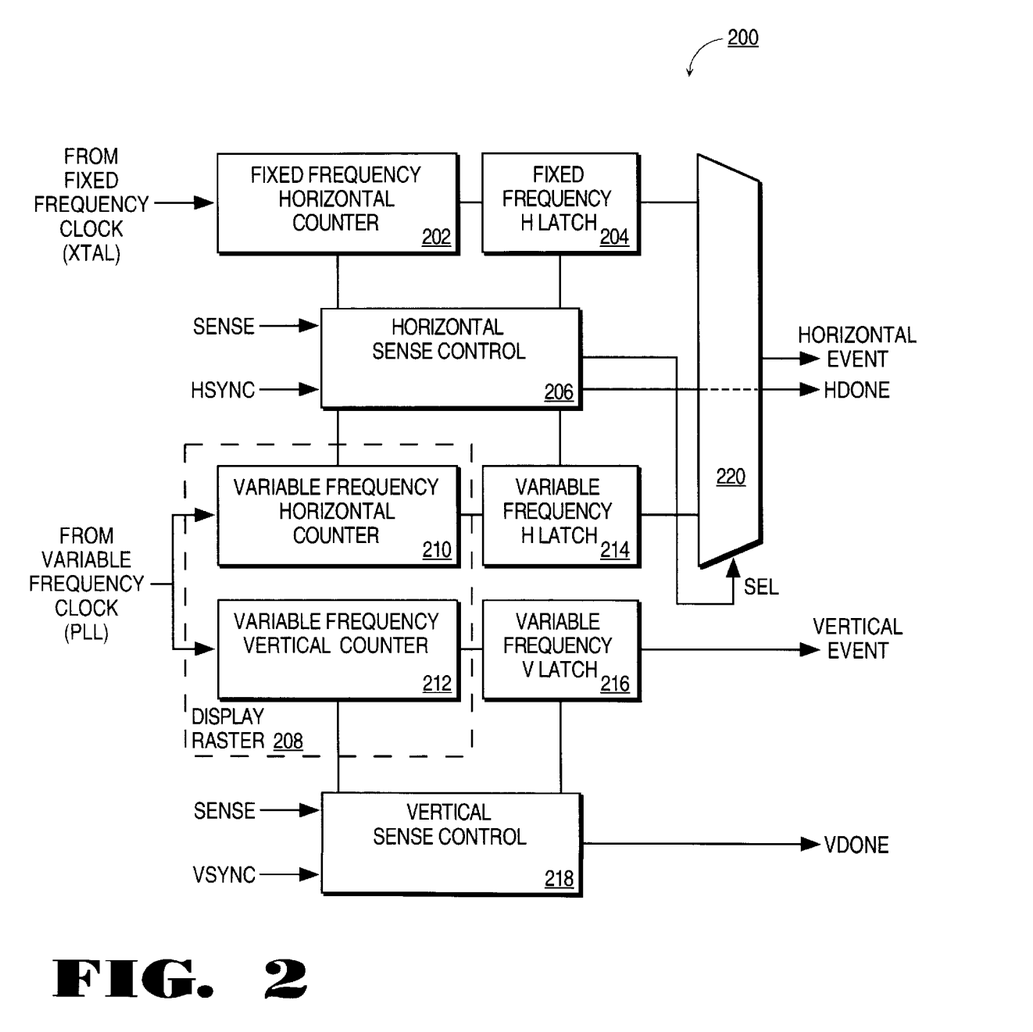
FIG. 2 illustrates the event sense circuitry of the video processor of the present invention.

The video display processor 128 includes event sense circuitry 200, as shown in FIG. 2. The event sense circuitry 200 includes a fixed frequency horizontal counter 202, which is driven by the fixed frequency dock 130. The counter 202 values are latched by a fixed frequency horizontal counter latch 204 under the control of a horizontal sense control circuit 206. A display raster 208 includes a variable frequency horizontal counter 210 and a variable frequency vertical counter 212, both of which are driven by the variable frequency clock 132. A variable frequency horizontal counter latch 214 latches values from the counter 210 under the control of the horizontal sense control circuit 206. A variable frequency vertical counter latch 216 latches values of the vertical counter 212 under control of a vertical sense control circuit 218. Values of the fixed frequency horizontal counter latch 204 or the variable frequency horizontal counter latch 214 are selected by a counter multiplexer (MUX) 220 under control of the horizontal sense control circuit 206.

Figure 3:
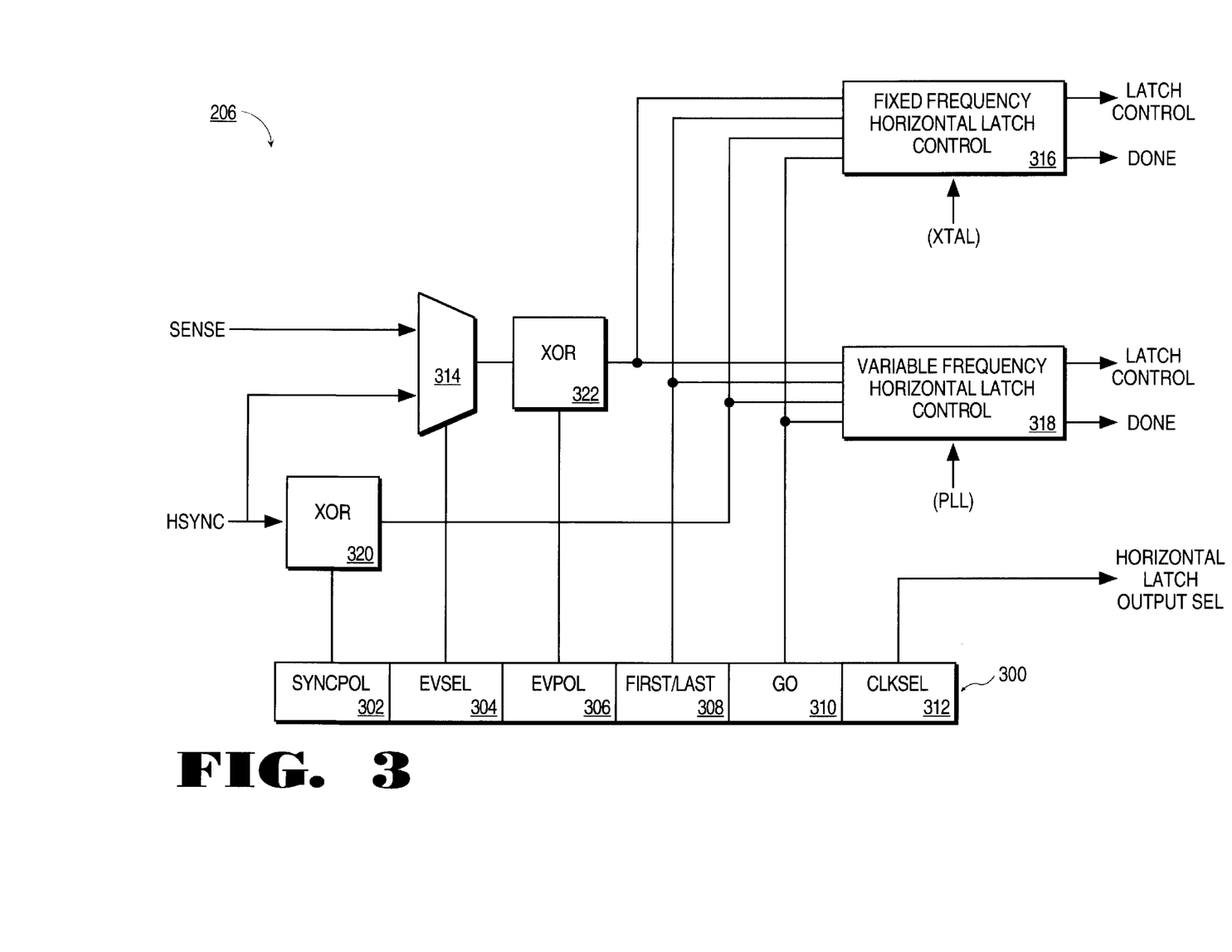
FIG. 3 illustrates the horizontal sense control circuit of the event sense circuitry of FIG. 2.

The horizontal sense control circuit 206 is illustrated in further detail in FIG. 3. The horizontal sense control circuit 206 is itself controlled by a horizontal event control register 300. Bits of the control register 300 are preferably written by the host CPU 100. The event control register 300 includes a sync polarity bit SYNCPOL 302, an event select bit EVSEL 304, an event polarity bit EVPOL 306, a FIRST/LAST bit 308, a GO bit 310, and a dock select CLKSEL bit 312. The horizontal sense control circuit 206 has a SENSE input and an HSYNC input from the remote graphics subsystem 106. The HSYNC input receives the horizontal sync signals. The SENSE input can be configured to receive a variety of signals including the remote blanking signal. Alternatively, for example, the SENSE input may receive the output of a color comparator (not shown) that can be used to detect the existence of a color patch from the RGB or YUV output of the graphics subsystem 106. These inputs provide "events" that are measured in order to calibrate the local raster with the remote raster, as described below.

The type of event input is selected by an event select multiplexer 314 under control of the EVSEL bit 304. The horizontal sense control 306 further includes a fixed frequency horizontal latch control circuit 316 and a variable frequency horizontal latch control circuit 318. The latch control circuits operate under control of the FIRST/LAST bit 308 and the GO bit 310 as described below. The latch control circuits also receive the HSYNC signal, preferably through an exclusive XOR gate 320 under control of the SYNCPOL bit 302. The latch control circuits further receive the MUX-selected input, preferably through an XOR gate 322 under control of the EVPOL bit 306. Those skilled in the art will understand that each XOR gate is used to select the polarity of the input signal that will produce an active output signal. The CLKSEL bit 312 selects either the fixed frequency horizontal counter latch 204 or the variable frequency horizontal counter latch 214 as the input to the counter multiplexer 220.

Figure 4:
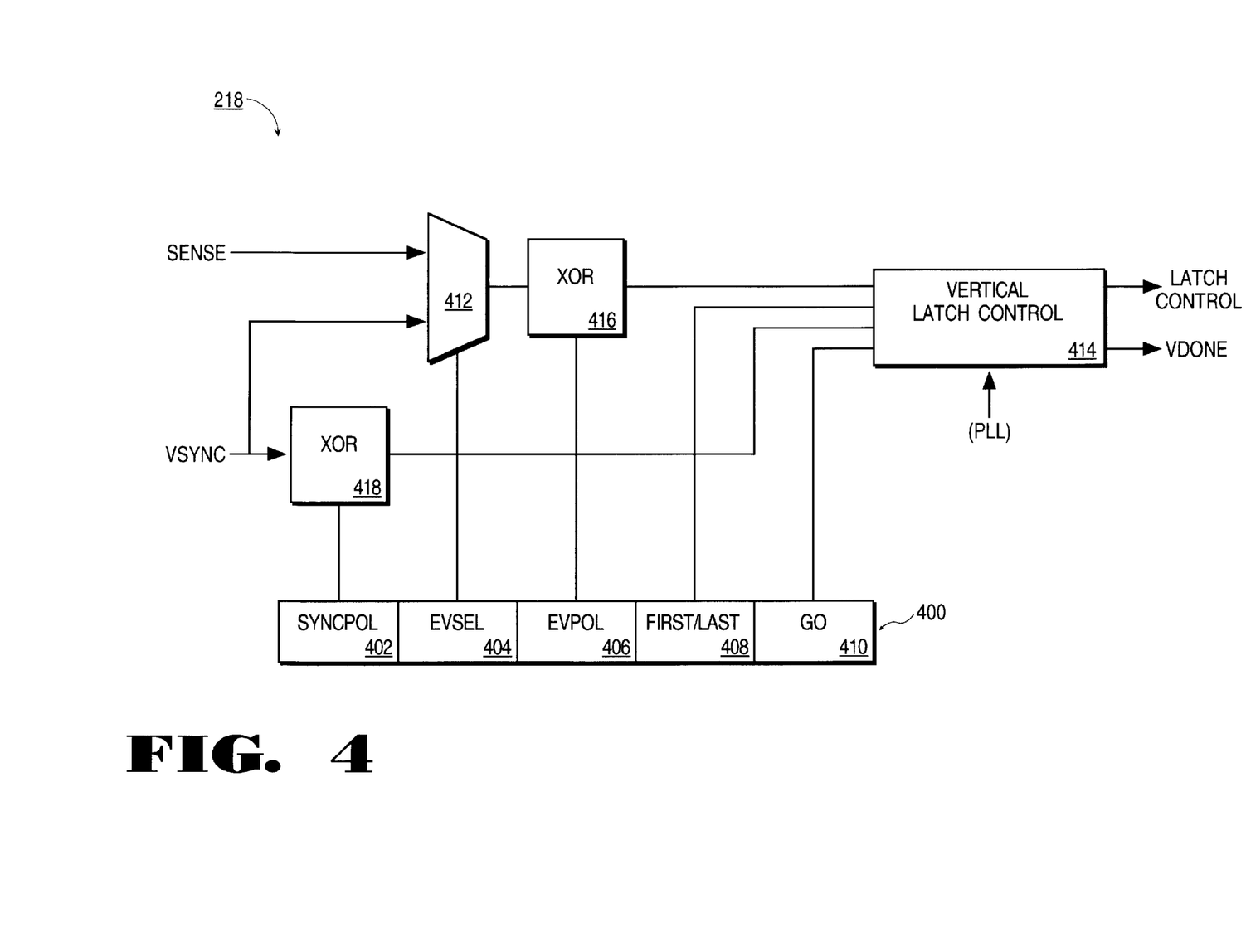
FIG. 4 illustrates the vertical sense control circuit of the event sense circuitry of FIG. 2.

FIG. 4 illustrates the vertical sense control circuit 218. The vertical sense control circuit 218 is controlled by a vertical event control register 400. The vertical event control register 400 includes a sync polarity bit SYNCPOL 402, an event select bit EVSEL 404, an event polarity EVPOL bit 406, a FIRST/LAST bit 408, and a GO bit 410. According to the EVSEL bit 404, an event select multiplexer 412 selects either the SENSE input or the VSYNC input as the input to a vertical latch control circuit 414, preferably through an exclusive OR gate 416 under control of the EVPOL bit 406. The vertical latch control circuit 414 also receives the VSYNC input, preferably through an exclusive OR gate 418 under control of the SYNCPOL bit 402. The vertical latch control circuit 414 is further controlled by the FIRST/LAST bit 408 and the GO bit 410.

In order for the local video subsystem 108 to overlay its video on the graphics generated by the remote graphics subsystem 106, the local video subsystem must align its internal raster to the raster generated by the remote graphics subsystem. As part of this alignment process, the local clock must be synchronized to the remote clock. If the external remote raster clock is not provided to the local video subsystem by the remote subsystem, then the present invention synchronizes the local clock frequency to the external remote dock frequency. Whether or not the remote clock is available, the present invention determines the alignment of the local raster with the external raster by measuring the location of a predetermined event generated by the external graphics subsystem. Examples of such events include color patches of known size and location that have been drawn into the external graphics device or the blanking signal from the external device.

Figure 5A:
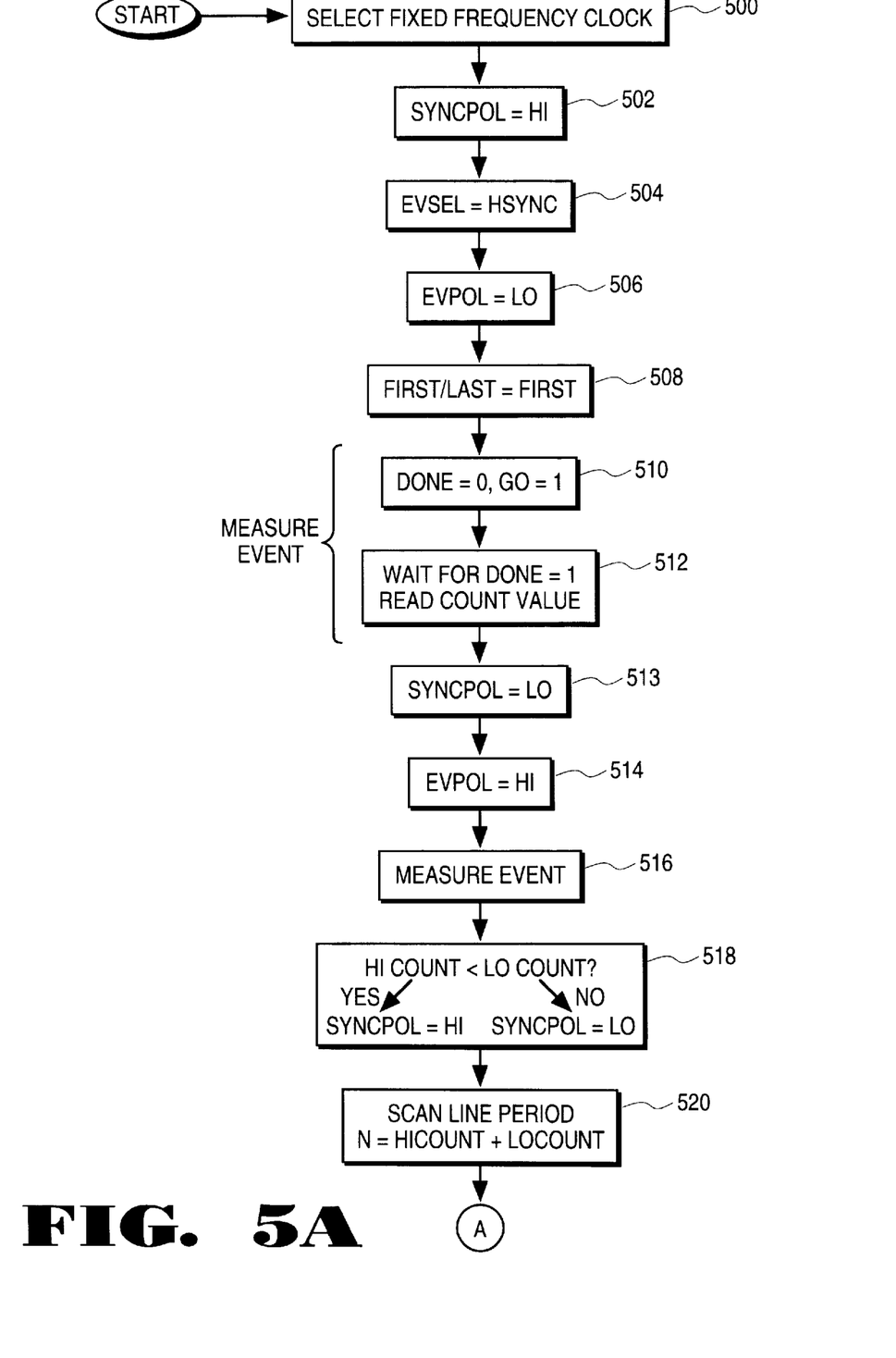
FIGS. 5A and 5B are flow charts diagramming the process of the present invention.
Figure 5B:
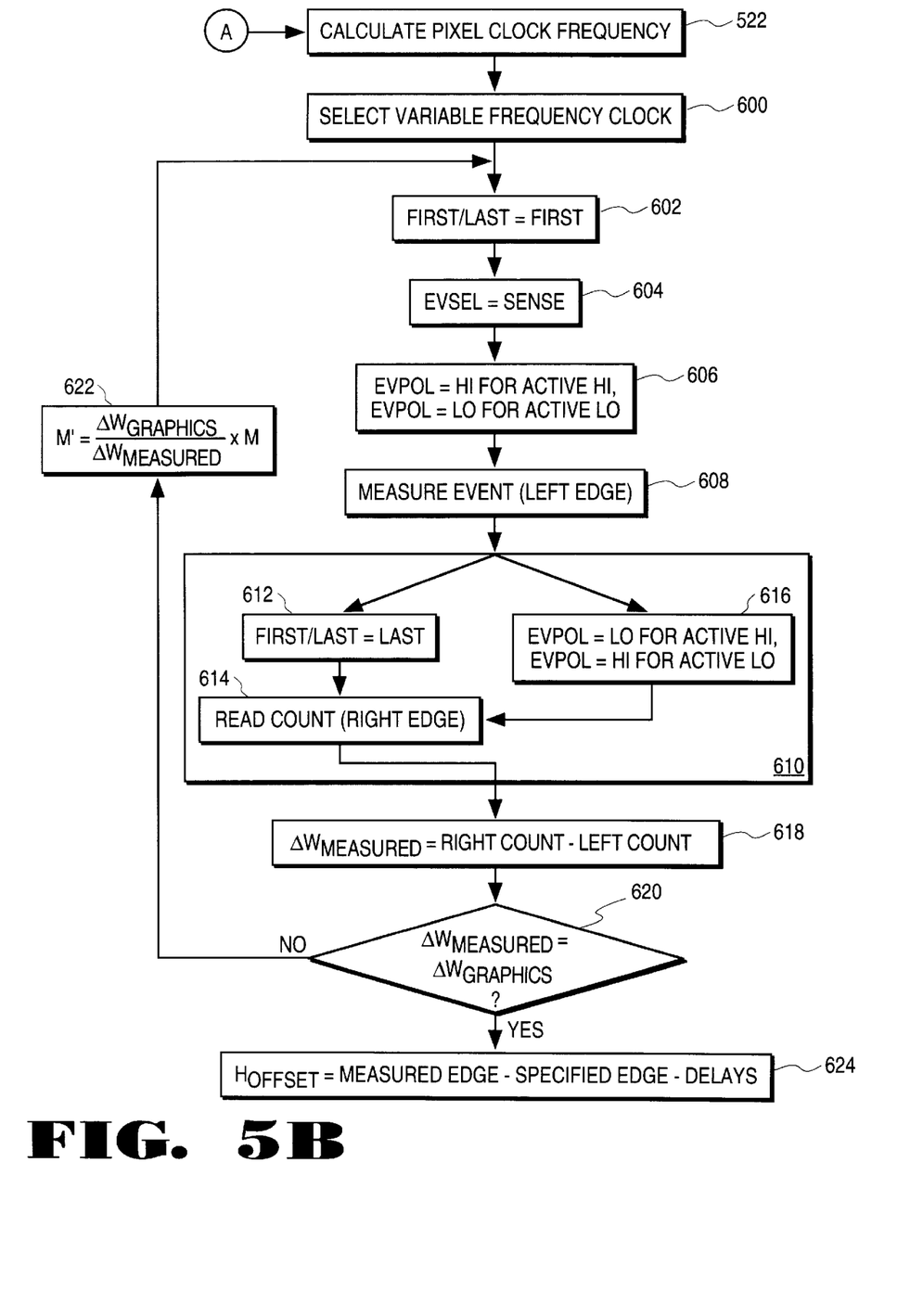

FIGS. 5A and 5B are flow charts diagramming the process of the present invention. It is assumed that the external clock frequency is unknown, although this may not be the case. In synchronizing the local clock to the external clock, it will be seen that a number of other parameters are determined as well. (If the external clock is available, the external clock may be input directly to the variable clock input of the local video display processor 128.)

As part of its determination of the external clock frequency, the present invention determines the sync pulse polarity and duration, and the scan line period. The present invention will be described herein as performing a series of operations in the horizontal direction first and then in the vertical direction. Those skilled in the art will understand that the order of the operations with respect to the horizontal and vertical directions may be switched without loss of generality.

To determine the polarity of the HSYNC pulse, the horizontal sync duration is first measured assuming that the horizontal sync pulse is active high, i.e., the leading edge is a rising edge. Then, the HSYNC duration is measured assuming that the pulse is active low, i.e., the leading edge is a falling edge. Because the horizontal sync pulse is short relative to the entire scan line, the shorter duration indicates the correct HSYNC polarity. The sum of the durations provides an estimate of the scan line period.

To measure the HSYNC duration under the assumption that the HSYNC pulse is active high, the host CPU 100 first writes the horizontal event control register 300. Because the measurement is made in absolute time, the CLKSEL bit 312 is set to select the fixed frequency horizontal counter latch 204 for the measurement (step 500). Because the external HSYNC signal is assumed to be active high, the host CPU 100 programs the SYNCPOL bit 302 to cause the horizontal sense measurement to begin on the rising edge of the external HSYNC (step 502).

Next, using the fixed frequency horizontal counter 202, the duration of the high portion of the presumed active high HSYNC pulse is measured. This procedure treats a rising edge received from the external HSYNC signal as an arming edge, and treats the first falling edge as an "event" that causes the fixed frequency horizontal counter latch 204 to capture the associated count.

More specifically, the EVSEL bit 304 is set to select the external HSYNC signal as the event input (step 504). The EVPOL bit 306 is set low to measure the falling edge (by detecting a low level) of the event input signal as an event that would trigger capture by the horizontal counter latch 204 (step 506). The FIRST/LAST bit 308 is set to measure the first occurrence of the event (step 508). (If the bit 308 were set to LAST, then each occurrence of the event (a low level HSYNC signal in this example) would be captured by the latch 204.) The host CPU 100 resets the DONE bit to zero to indicate that the measurement procedure is not complete, and sets the GO bit to one to begin measurement (step 510). Alternatively, setting the GO bit may cause the DONE bit to reset until the measurement is complete. As in conventional video processors, the leading edge of HSYNC (as determined by the SYNCPOL bit 302) resets the horizontal counters 202 and 210 to a zero count.

Figure 6A:
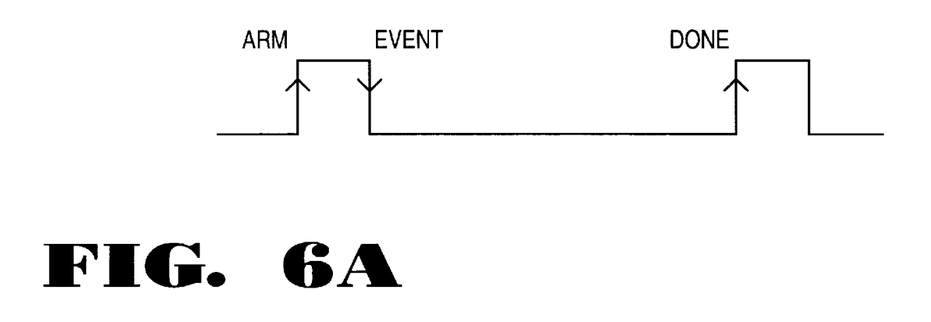
FIGS. 6A and 6B are timing diagrams illustrating the measurement of the horizontal sync pulse.

The measurement process will be described with respect to the external HSYNC signal illustrated in FIGS. 6A and 6B. Because the SYNCPOL bit 302 is set high, the latch control circuit 316 starts the count in the fixed frequency horizontal counter 202 in response to the first sync rising edge (high level). The first falling edge (low level) encountered after that rising edge is treated as an event because the EVPOL bit 306 is set low. Through the HSYNC input to the event select MUX 314 and the exclusive OR gate 322, the HSYNC falling edge is input to the fixed frequency horizontal latch control circuit 316. Because the FIRST/LAST bit is set to FIRST, the fixed frequency horizontal latch control circuit 316 only latches the count of the horizontal counter 202 for the first occurrence of the event, i.e., only for the falling edge itself (the first low level) and not for the subsequent counts at which the HSYNC signal is at a low level. This latched count represents the duration of the high portion of the HSYNC signal. On the next HSYNC rising edge, as detected by the fixed frequency horizontal latch control circuit 316 through the XOR gate 320, the control circuit 316 outputs a DONE signal to the host CPU 100. In response to the DONE signal, the host CPU 100 reads the count value from the fixed frequency horizontal counter latch 204 through the MUX 220 (step 512). From hereon, the steps 510 and 512 will together be summarized in one step as "measure event."

Optionally, the value read from the fixed frequency horizontal counter latch 204 may be multiplied by the period of the fixed frequency clock 130 to determine the real time duration of the high portion of the horizontal sync signal.

To complete the determination of the sync pulse polarity and scan line duration, the SYNCPOL bit 302 is set low (step 513), and the EVPOL bit is set high (step 514). The count duration for this event is then measured (step 516).

Figure 6B:
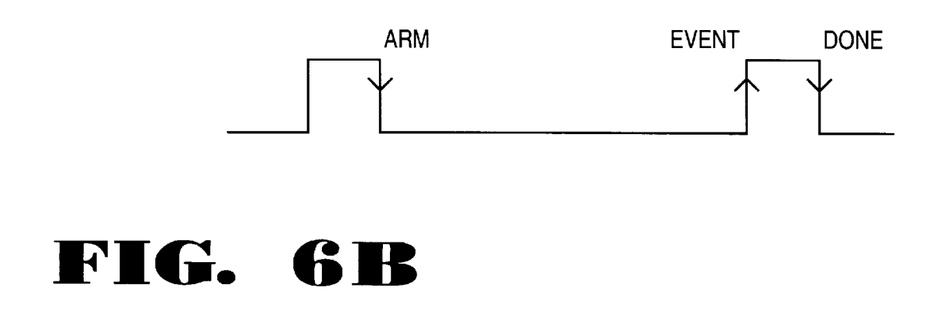

In this case, referring to FIG. 6B, the first falling edge (low level) of the sync signal that is encountered passes through the XOR gate 320 and is treated by the fixed frequency horizontal latch control circuit 316 as the arming edge to start the horizontal counter 202. Because the EVPOL bit 306 is now set high, the subsequent rising HSYNC edge that passes through the event select MUX 314 and the XOR gate 322 is treated as an event by the fixed frequency horizontal latch control circuit 316. Because the FIRST/LAST bit remains set to FIRST, the control circuit 316 latches the count of the horizontal counter 202 in response to the HSYNC rising edge, to thereby provide a measurement in counts of the low portion of the external HSYNC signal. Because the SYNCPOL bit 302 is set low, the control circuit 316 outputs the DONE signal in response to the next HSYNC falling edge. The HSYNC falling edge resets the horizontal counter 202. The DONE signal, either by interrupting the CPU or by being polled by the CPU, signals the host CPU 100 that the measurement process is complete. The host CPU 100 may then read the latched value from the fixed frequency horizontal counter latch 204 through the MUX 220. By multiplying this count value by the fixed frequency clock period, an absolute measure of the low portion of the HSYNC signal may be obtained.

To determine the polarity of the HSYNC signal, the host CPU 100 compares the so-called "high count" measurement of the high portion of the HSYNC signal to the "low count" measurement of the low portion of the HSYNC signal (step 518). Typically, a sync signal occupies only a small portion of a scan line. If the high count value is less than the low count value, then the HSYNC signal is active high and the host CPU 100 thereby sets the SYNCPOL bit high to indicate that the HSYNC signal should be treated in this manner. On the other hand, if the low portion of the HSYNC signal is shorter in duration than the high portion, then the HSYNC signal is active low and the host CPU 100 thereby sets the SYNCPOL bit 302 low (step 518). Knowing the horizontal (vertical) sync polarity and setting the SYNCPOL bit 302 (402) accordingly ensures that the local raster is calibrated to the left (top) edge of the external remote raster (i.e., to the leading edge of HSYNC (VSYNC)).

After the high count and low count values have been determined, the host CPU 100 adds those values together to obtain the scan line period as measured in counts (step 520). This value can be multiplied by the period of the fixed frequency clock 130 to determine the real time measurement of the scan line period. This value is, in fact, only an estimate of the exact scan line period (N) because the clock frequency used for measuring the duration is different from the dock used for generating the external HSYNC. Therefore, a small uncertainty is inevitable.

Assuming the external clock signal is not available, the pixel dock frequency may be calculated according to a number of methods (step 522). The pixel clock frequency represents the number of pixels per second that are output to the display 110. The pixel dock signal is provided by the variable frequency dock 132, preferably implemented as a programmable phase locked loop (PLL). Software running on the host CPU 100 or other processing logic initializes the PLL with an estimated pixel clock count M, representing the estimated number of total (visible and nonvisible) external dock pulses in a scan line.

As is known in the art, the PLL includes a frequency dividing counter. In one embodiment, software in the host CPU 100 or other processing logic initializes the PLL counter with M=N, the estimated scan line period measured above. The output of the counter is phase compared to HSYNC as the reference clock. The results of this comparison are used to modulate the counter output frequency until the counter is phase locked to the external HSYNC signal. In this manner, the PLL variable frequency clock is roughly calibrated to the remote raster clock.

As an alternative, the host CPU 100 or other processing logic may set the initial M count as a function of the visible display resolution, which is usually known to the operating system. For example, if the display resolution is specified as 1024×768, those numbers indicate that 1024×768 pixels are visible on the display. However, a number of pixel clocks cycles associated with invisible pixels lie in the non-visible blanking intervals in both the horizontal and vertical directions. Therefore, a visible display resolution of 1024×768 may actually represent, for example, a total line display resolution of 1300 pixel clocks (both visible and non-visible) in a horizontal scan line and 900 visible and non-visible scan lines in the vertical direction.

In one technique employing the visible display resolution to initialize the M count, the horizontal resolution may be multiplied by a resolution scaling factor F to estimate the total number of visible and nonvisible pixel clocks in a scan line (referred to as the total display resolution). For example, if F is selected to be 1.3, a known visible resolution of 1024 would yield an estimate of approximately 1300 pixel clocks as the total display resolution.

In practice, one visible resolution may map to a number of total (visible and nonvisible pixels) display resolutions depending upon the display standard that is employed. In that case F may be selected according to a number of criteria, e.g., to obtain a result that is an average of the standard total display resolutions or the most popular total display resolution.

As an alternative, rather than using a scaling factor, the host CPU 100 may maintain a look-up table (LUT) 103 in host memory 102 that maps visible display resolution to an estimate of the total number of pixel clocks in a scan line, e.g., 1300. This estimate may be refined to better account for different display standards by mapping the known visible display resolution and the measured scan line period to the total number of pixel clocks per line. For example, a known visible display resolution of 1024 may map to multiple total display resolutions. The measured scan line period may then be used as an index into the LUT 103 to select the total display resolution that best approximates the measured scan line period. This selected resolution is used as the M value to initialize the PLL.

Regardless of the method used, the variable frequency dock 132 has, at this point, been initialized and phase locked to the external HSYNC signal (after providing some time for the PLL to settle, e.g., 0.1 second).

The present invention obtains a finer calibration of the pixel dock frequency by measuring the width of a graphics object of known size. Examples of such objects include a patch of key color, the entire visible raster, or the blanking signal. An appropriate choice will depend upon the particular method of video merging and/or key detection used in the system. If key detection hardware is available then it can be used to determine the coordinates of the color patch. See, e.g., "Method and Apparatus for Analog Video Merging and Key Detection," U.S. application Ser. No. 08/255,666, filed Jun. 9, 1994. In the color patch implementation, for example, the host CPU 100 instructs the graphics subsystem 106 to produce a color patch having a known height and width and starting at predetermined X and Y coordinates. These known coordinates will be compared to measured coordinates to calibrate the variable frequency clock 132.

The calibration of the frequency of the variable frequency clock 132 will now be described. Because it is the variable frequency clock 132 that is being calibrated, the host CPU 100 programs the horizontal event control register CLKSEL bit 312 to select the variable frequency clock (step 600). To measure the left edge of the calibrating event, the host CPU 100 sets the FIRST/LAST bit 308 to FIRST (step 602). The host CPU 100 sets the EVSEL bit 304 to select the SENSE input to the horizontal sense control circuit 206 (step 604). To sense a color patch, for example, the RGB signals from the remote graphics subsystem 106 are input to a color comparator (not shown) that preferably outputs an active high signal in response to detection of a color patch. The color comparator output is input to the SENSE input of the horizontal sense control circuit 206. If the event being measured, however, is the visible raster interval or the blanking interval, then the blanking signal output from the graphics subsystem 106 is fed directly to the SENSE input of the horizontal sense control circuit 206. (The blanking signal is used to measure the visible raster because the visible raster length=scan line period–blanking interval.)

Figure 7A:
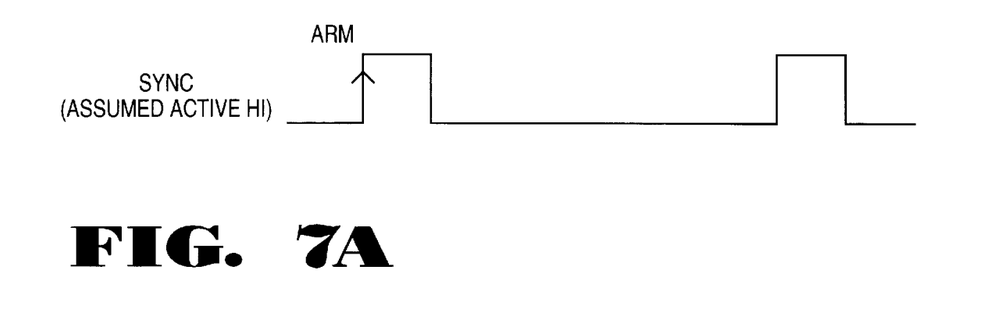
FIGS. 7A, 7B and 7C are timing diagrams illustrating the measurement of a graphics object.
Figure 7B:
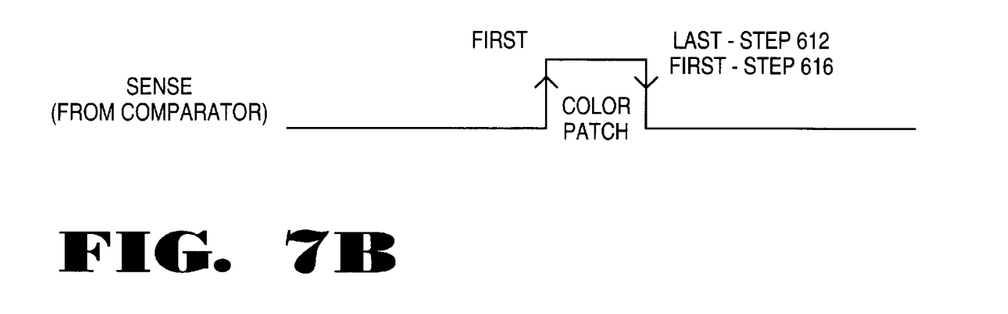
Figure 7C:
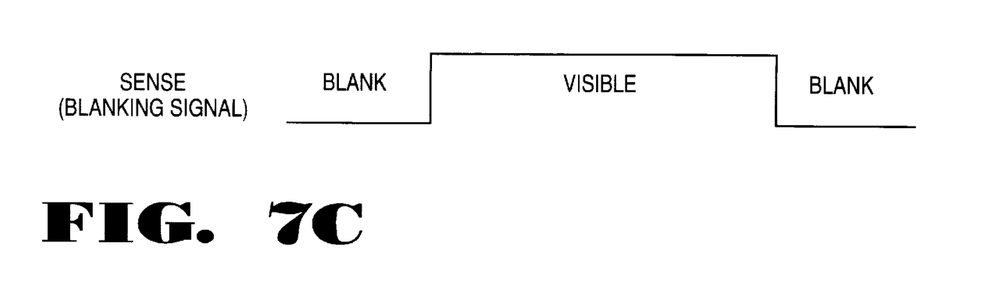

Assuming that the color patch is active high or the visible raster interval is active high (i.e., the blanking interval is active low), the EVPOL bit 306 is set high to measure the left edge of those events. To measure the visible raster interval with the blanking signal input to the SENSE input, the EVPOL bit 306 is set high to measure the left edge of the visible interval (step 606). The SYNCPOL bit 302 is set to the value determined previously. FIGS. 7A, 7B and 7C are timing diagrams illustrating the measurement of a graphics object. In FIGS. 7A, 7B and 7C, it is assumed that the horizontal sync signal is active high.

After setting up these bits, the host CPU 100 resets the DONE bit to zero and sets the GO bit to one to commence the process for measuring the left edge of the selected event (step 608). After the GO bit has been set, the rising edge of the HSYNC signal arms the variable frequency horizontal counter 210 to commence counting at the frequency determined by the variable frequency clock 132. To measure an active high event, such as the color patch or the visible raster interval, as examples, the variable frequency horizontal latch control circuit 318 will cause the variable frequency horizontal counter latch circuit 214 to latch the count of the variable frequency horizontal counter 210 upon the first occurrence of a high-level signal at the SENSE input, as shown in FIGS. 7A, 7B and 7C.

When the left edge of the active high event is encountered, the latched count in the variable frequency horizontal counter latch 214 represents the number of counts measured from the left edge of the HSYNC signal. For convenience, the left edge of the graphics object is preferably made coincident with the left edge of the visible portion of the raster because application or other software running on the host CPU 100 preferably specifies video pixel locations with respect to the start of the visible raster interval. Of course, it is not necessary to position the graphics object in this manner since its position is known.

After the left edge of the event has been measured, the host CPU 100 then sets up the horizontal event control register 300 to measure the right edge of the event (step 610). In one embodiment, the right edge is measured by setting the FIRST/LAST to LAST (step 612). Under control of the FIRST/LAST bit 308, the variable frequency horizontal latch control circuit 318 opens the variable frequency horizontal counter latch 214 to continue latching the count of the variable frequency horizontal counter 210 until the event is over. In the case of an active high color patch, the latch will continue latching counts as long as the SENSE signal from the color comparator is high, and will discontinue latching upon detection of a low level sense signal. When the next rising edge (high-level) of the HSYNC signal is sensed by the variable frequency latch control circuit 318, that circuit will set the DONE bit to indicate the end of measurement. The host CPU 100 then reads the right edge measurement (step 614).

Note that the invention supports events, such as color patches, with a height as short as a single scan line. In that case, the measurements of the beginning and the end of the event are made in separate frames. Calibration can be achieved more quickly, however, if the event has a height covering a number of scan lines so that both measurements can be made within the same frame. In the horizontal dimension, wider events produce more accurate measurement results than narrow events because total measurement time is large relative to the clock.

Preferably, when the FIRST/LAST bit is set to FIRST, the measurement process is deemed complete and the DONE bit is set immediately after the event occurs. However, when the FIRST/LAST bit is set to LAST, the process is complete only after the occurrence of the first sync signal after the occurrence of the event.

In an alternative embodiment, the latch control circuits may be made edge-triggered rather level-triggered. In that case, as an alternative means of measuring the right edge, the host CPU 100 sets the EVPOL bit 306 low to measure the right edge of an active high event or high to measure the right edge of an active lower event (step 616). In the case of the active high color patch, for example, the variable frequency horizontal latch control circuit 318 will cause the variable frequency horizontal counter latch 214 to latch the count of the horizontal counter 210 in response to the falling right edge of the color patch.

Using the right and left edge values measured according to any of the above-described methods, the host CPU 100 calculates the difference to determine the width of the graphics event (step 618). The host CPU 100 (processing logic) then compares this measured width with the known width of the event (step 620). If the measured width is larger than the actual graphics object width, then the variable frequency clock is too fast. If the measured width is smaller, then the variable frequency clock is too slow. If the two widths are different, the frequency of the variable frequency clock 132 may ideally be determined by the processing logic according to the formula:

$$M' = \frac{\Delta W_{graphics}}{\Delta W_{measured}} * M$$

where M'=adjusted M count (corresponding to adjusted pixel clock frequency), $\Delta W_{graphic}$=known width of the graphics object, e.g., the color patch, the visible raster or the blanking interval, and $\Delta W_{measured}$=measured width of the graphics object (step 622).

After the clock frequency has been adjusted (the processing logic reinitializes the M count with M'), the left and right edges are again measured, and the process repeated until the measured width equals the known width. When this occurs, the variable frequency clock 132 has been accurately calibrated.

After the variable frequency clock 132 has been calibrated or the remote graphics dock otherwise made available to the local video subsystem 126, the graphics and video rasters must be aligned.

Figure 8:
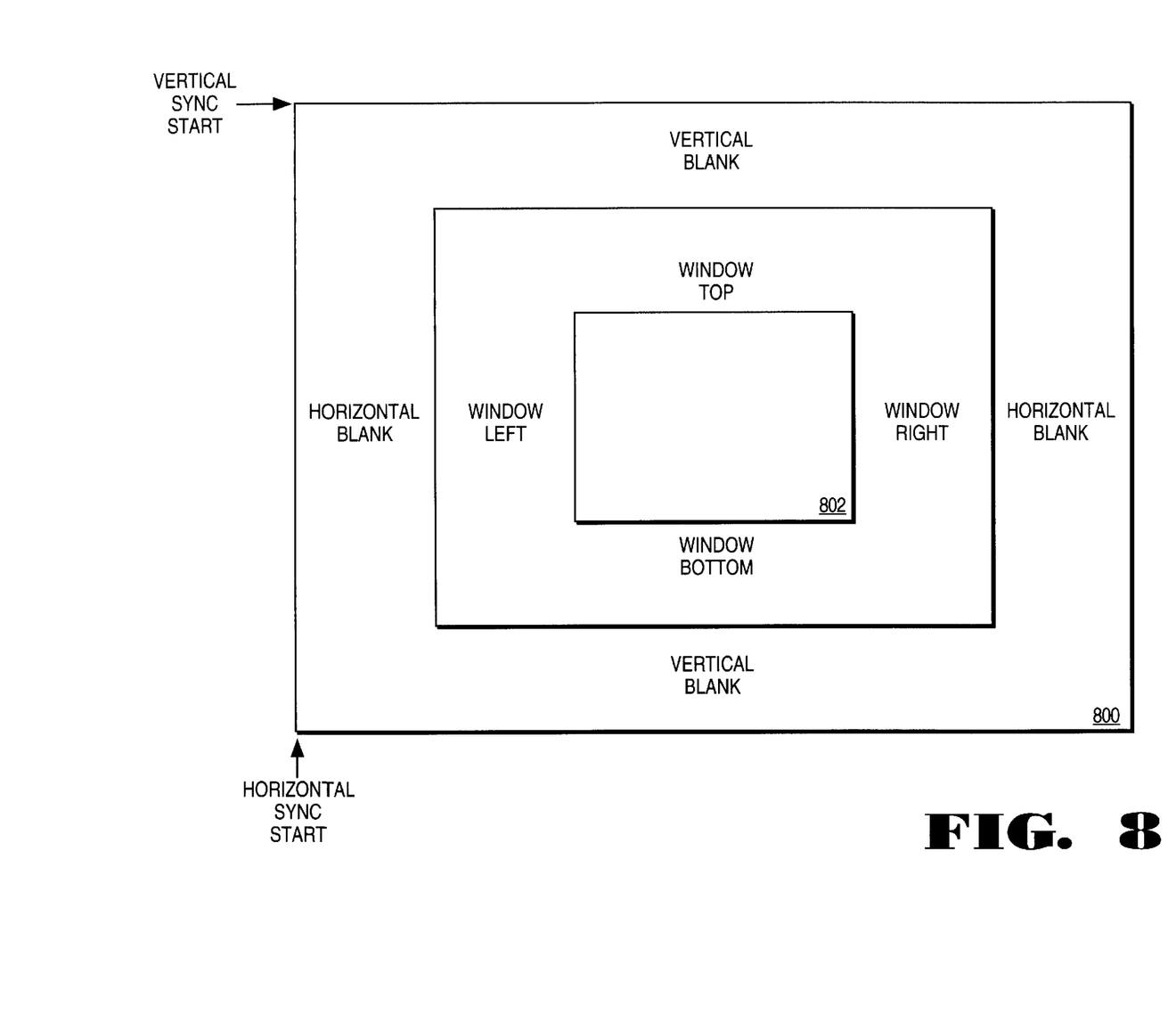
FIG. 8 illustrates a display raster displaying a display window.
Figure 9:
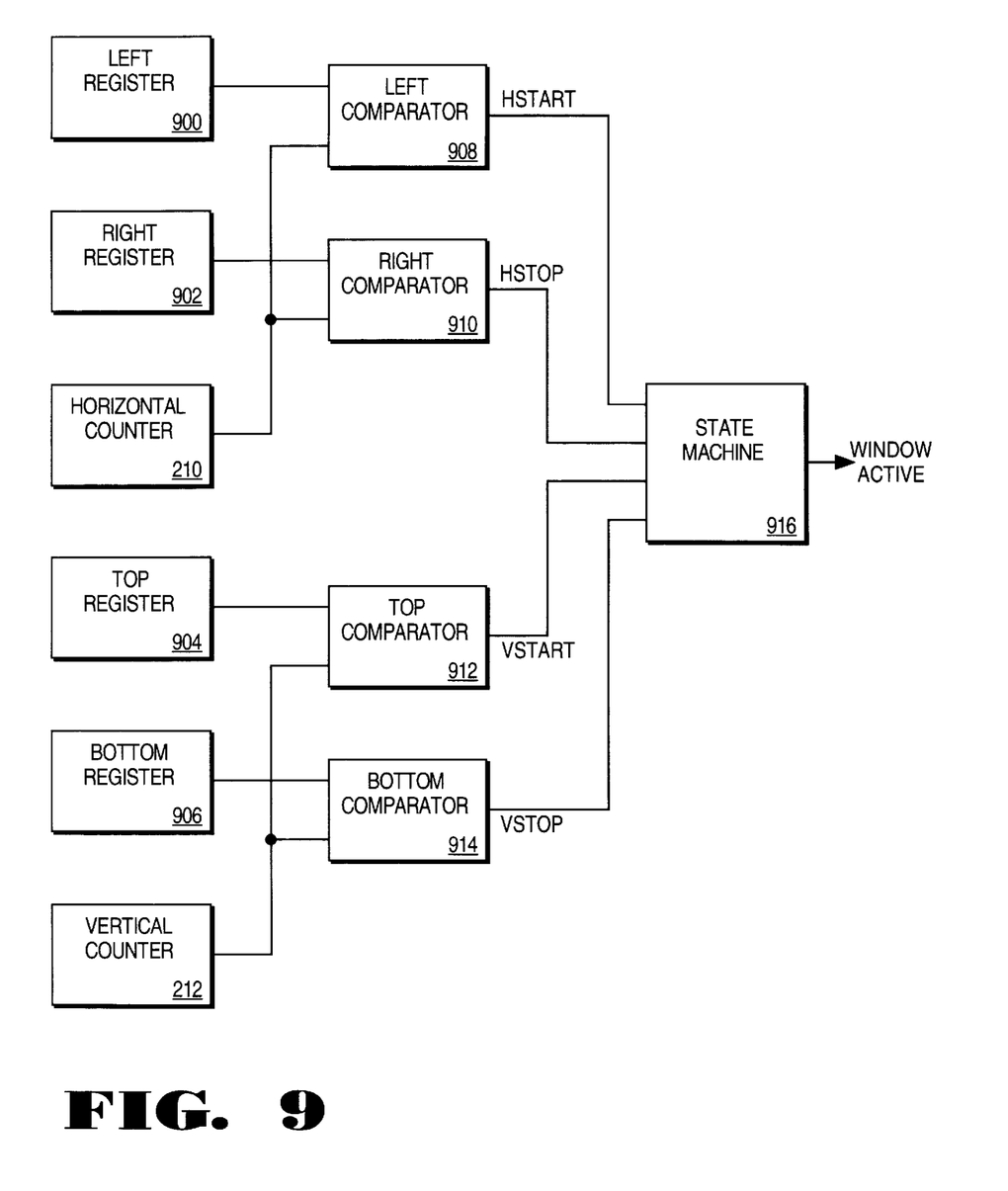
FIG. 9 illustrates display raster hardware for determining the position of a display window.

FIG. 8 illustrates a display raster output 800 displaying a display window 802. The display window 802 appears in the visible portion of the raster output 800, which is bordered by horizontal and vertical blanking intervals. FIG. 9 illustrates hardware in the display raster 208 for determining the position of the display window 802. The horizontal counter 210 keeps track of the current horizontal position of the raster. As the count in the counter increases, the raster sweeps from left to right. The counter is reset each time when HSYNC is received from the remote graphics device, and a new scan line begins at that point.

Similarly, the vertical counter 212 keeps track of the current vertical position of the raster. As the vertical counter count increases, the raster sweeps from top to bottom. The counter is reset each time a VSYNC signal is received from the remote graphics device. The four boundary lines of each display window 802 are specified in a display window left register 900, a display window right register 902, a display window top register 904, and a display window bottom register 906, which are programmed by the host CPU 100 or other external processor. These registers define the borders of the display window.

A left comparator 908 and a right comparator 910 determine where, across the raster, a display window respectively begins and ends in the horizontal dimension. The left and right comparators compare the horizontal counter value with values programmed into the left and right registers, respectively. When a match is found for the left edge, the left comparator 900 emits a horizontal start signal HSTART. Similarly, when a match is found for the right edge, the right comparator 902 emits a horizontal stop signal HSTOP.

In a similar manner, a top comparator 912 and a bottom comparator 914 determine where, across the raster, a display window begins and ends in the vertical dimension. The top and bottom comparators compare the vertical counter value with values programmed into the top and bottom registers, respectively. When a match is found for the top edge, the top comparator 912 emits a vertical start signal VSTART. Similarly, when a match is found for the bottom edge, the bottom comparator 914 emits a vertical stop signal VSTOP.

The start and stop signals are input to a state machine 916, which determines whether the current raster position (as defined by the values in the horizontal counter 210 and the vertical counter 212) is within the display window 802.

The raster operation described above is similar to a standard display raster found in computer display systems in which counters, registers and comparators determine when the raster is visible or invisible, i.e., they determine when to assert the blanking signal. Here, because the window size and position are dynamic, as opposed to the static visible display area, the left, right, top and bottom registers are reprogrammed by the host CPU 100 as the computer operator moves or resizes the display window.

The display window left and right values specified in the left and right registers are preferably referenced to the leading edge of the horizontal sync pulse. Therefore, in addition to pixels visible on the display screen, the values must also include invisible pixels which occur during horizontal blanking after the leading edge of the horizontal sync signal. The values must also take into account pipeline delays through the display processing hardware internal to the video subsystem 126, as well any pipeline delays from external devices such as digital-to-analog converters.

User application software or other software running on the host CPU 100 preferably specifies the location of video pixels within a window with reference to visible pixels only, not taking into account the blanking intervals and delays. Because the display raster (as specified by the left and right registers) is measured from the leading edge of the horizontal sync pulse, an offset must be added to the software-specified coordinates to determine those coordinates with reference to the horizontal sync pulse. The horizontal offset is calculated by the host CPU 100 or other external processor as follows:

$$\text{horizontal offset} = \text{measured left edge} - \text{specified left edge} - \text{pipeline delays},$$

where the measured left edge is the left edge of the graphics object previously measured (relative to HSYNC), and the specified left edge is the left edge of the graphics object specified by the software in terms of visible pixels (step 624).

When the horizontal offset is added to a pixel position specified by the software, the result will indicate the position of the pixel in the display raster with respect to the leading edge of the horizontal sync pulse.

The next task is to determine the vertical sync polarity and offset. The determination of parameters in the vertical direction is essentially the same as the procedure followed to determine parameters in the horizontal direction. To determine vertical sync polarity, the low portion of the vertical sync signal may first be measured (SYNCPOL initially is set low). For example, the duration of the low portion of the VSYNC signal may be measured by setting the FIRST/LAST bit 408 in the vertical event control register 400 to FIRST, the EVSEL bit 404 to select the VSYNC signal, and the EVPOL bit 406 to high to measure the rising edge. This procedure latches the vertical count value when the first VSYNC rising edge is encountered, after arming the vertical counter 212 in response to the VSYNC falling edge.

The duration of the low portion of the vertical sync signal is then compared with the vertical size of the raster (as determined by the earlier software table look-up). Since the vertical sync is normally short relative to the total vertical raster, the external vertical sync signal is determined to be active low if the number of scan lines measured is less than one-half the number of visible (or alternately, total) scan lines in the graphics raster. Otherwise, it is active high. The SYNCPOL bit 402 is set according to this determination. Note that both the low and high measurements are not required because the external raster clock frequency has already been determined during the horizontal measurements.

After the VSYNC polarity has been set, all measurements are known to be from the leading edge of the VSYNC signal. To obtain alignment in the vertical direction, the top edge of a graphics object is then measured. For example, in the case of the active high color patch, the top edge is indicated by a rising edge on the SENSE input. The number of displayed scan lines between VSYNC and the top edge is determined by setting the EVSEL bit 404 to the SENSE input (receiving the color comparator output), the EVPOL bit 406 to active high, and the FIRST/LAST bit 408 to FIRST. The event is then measured. The vertical counter 212 may count in terms of whole scan lines, or in terms of half scan lines to support interlaced rasters. In the latter case, those skilled in the art will understand how to modify the present invention without undue experimentation to take interlacing into account. For example, after measuring the above event, the event would be measured again, and the lesser of the two values would be used when calculating the vertical offset below.

As mentioned above, graphics coordinates are usually in terms of visible pixels only. However, vertical coordinates in the video subsystem 126 of the present invention include the invisible (blanked) display lines following the vertical sync signal, as well as visible scan lines. The vertical offset is a function of the measurement of the top edge taken above less the top edge specified in visible graphics coordinates by the host CPU 100. For non-interlaced rasters, the vertical dimension is typically measured in half scan lines. In that case, the measured top edge value must be divided by two to yield a measure of the full scan lines for the vertical offset calculation. The formula for the non-interlaced vertical offset is:

$$\text{vertical offset} = \text{measured top edge}/2 - \text{specified top edge}$$

For interlaced rasters, the vertical dimension is also measured in half scan lines, but each scan line in each field actually traverses two scan lines of vertical space as viewed in the complete two-field interlaced frame. Therefore, the measured top edge value need not be divided by two. However, two measurements must be made, one for each field and the lesser of the two used for the calculation. The formula for the interlaced vertical offset is:

> vertical offset=lesser of the two measured top edge values−specified top edge value.

In a non-interlaced raster in which the vertical dimension is measured in full scan lines, the formula for the vertical offset is:

> vertical offset=measured top edge value−specified top edge value

At this point, the video raster is calibrated and aligned with the graphics raster. By adding the software-specified "visible" coordinates to the offsets, video images from either the host CPU 100 or the capture device 112 will be properly placed by the video display processor 128 within windows generated by the remote graphics subsystem 106.

It will be appreciated that various modifications and alterations might be made by those skilled in the art without departing from the spirit and scope of the present invention. In particular, those skilled in the art will recognize that all actions performed by the host CPU 100 may be performed by any type of processing logic, including, without limitation, hardware, software or firmware. The invention should, therefore, be measured in terms of the claims which follow.

What is claimed is:

1. Calibration circuitry configured to calibrate a local raster of a local video subsystem to a remote raster of a remote video subsystem, the remote video subsystem for providing a sync signal to the local video subsystem, the local video subsystem including a local raster clock and a remote raster clock configured to generate a remote raster clock signal, the calibration circuitry comprising:

processing logic configured to initialize the local raster clock with an initial clock count corresponding to a frequency of the local raster clock, the initialized local raster clock configured to be phase locked to the sync signal to thereby generate an estimate of the remote raster clock signal, wherein the estimated remote raster clock signal has an estimated remote raster clock frequency.

2. The calibration circuitry of claim 1, wherein the local raster clock is a phase locked loop.

3. In a computer system including a local video subsystem and a remote video subsystem, wherein the local video subsystem has a local raster and the remote video subsystem has a remote raster, the local raster has a local raster clock and the remote raster has a remote raster clock for generating a remote raster clock signal, the remote video subsystem for providing a sync signal to the local video subsystem, a method for calibrating the local raster to the remote raster, the method comprising the steps of:

initializing the local raster clock with an initial clock count corresponding to a frequency of the local raster clock; and phase locking the local raster clock to the sync signal, so that the local raster clock generates an estimate of the remote raster clock signal, wherein the estimated remote raster clock signal has an estimated remote raster clock frequency.

4. The method of claim 3, wherein the local raster clock is a phase locked loop.

5. A computer system comprising:

a display device;

a bus;

a processor coupled to the bus;

a remote graphics subsystem coupled to the bus;

a local video subsystem coupled to the bus, to the remote graphics subsystem and to the display device, said local video subsystem comprising logic to initialize a local raster clock of the local video subsystem with an initial clock count corresponding to a frequency of the local raster clock, the initialized local raster clock further configured to be phase locked to a sync signal provided by the remote graphics subsystem, said phase locked initialized local raster clock estimating a remote raster clock frequency of the remote graphics subsystem.

6. The computer system as set forth in claim 5, wherein the local raster clock comprises a phase locked loop.

7. The computer system as set forth in claim 5, wherein the initial count corresponds to an estimated number of total external clock pulses in a scan line.

* * * * *